United States Patent
Ko

(10) Patent No.: US 9,610,687 B2
(45) Date of Patent: Apr. 4, 2017

(54) APPARATUS FOR DRIVING WEARABLE ROBOT

(71) Applicant: Hyundai Motor Company, Seoul (KR)

(72) Inventor: Hun Keon Ko, Seoul (KR)

(73) Assignee: Hyundai Motor Company, Seoul (KR)

( * ) Notice: Subject to any disclaimer, the term of this patent is extended or adjusted under 35 U.S.C. 154(b) by 335 days.

(21) Appl. No.: 14/328,194

(22) Filed: Jul. 10, 2014

(65) Prior Publication Data

US 2015/0165622 A1    Jun. 18, 2015

(30) Foreign Application Priority Data

Dec. 17, 2013   (KR) .................. 10-2013-0156979

(51) Int. Cl.
  *B25J 9/10*  (2006.01)
  *B25J 9/00*  (2006.01)
(52) U.S. Cl.
  CPC ........... *B25J 9/1045* (2013.01); *B25J 9/0006* (2013.01)
(58) Field of Classification Search
  CPC .................. B25J 9/0006; B25J 9/1045
  See application file for complete search history.

(56) References Cited

U.S. PATENT DOCUMENTS

| 6,668,678 B1* | 12/2003 | Baba | B25J 9/104 414/680 |
| 8,565,918 B2* | 10/2013 | Abdallah | H01R 13/17 700/245 |
| 2015/0165621 A1* | 6/2015 | Ko | B25J 9/104 74/490.04 |

FOREIGN PATENT DOCUMENTS

| JP | 2005-046980 A | 2/2005 |
| JP | 2010-220786 A | 10/2010 |
| KR | 10-20100077504 | 7/2010 |
| KR | 10-2012-0059305 | 6/2012 |
| KR | 10-2012-0122054 | 11/2012 |
| KR | 10-2013-0106970 A | 10/2013 |

* cited by examiner

Primary Examiner — Terence Boes
(74) Attorney, Agent, or Firm — Mintz Levin Cohn Ferris Glovsky and Popeo, P.C.; Peter F. Corless

(57) ABSTRACT

An apparatus for driving a wearable robot includes a wire having one end connected to an arm of the wearable robot, a tension detector that is provided between the one end and the other end of the wire and detects tension of the wire, a driver that is connected to the other end of the wire and winds or unwinds the wire, and a controller that controls the driver to be operated to wind or unwind the wire when the arm rotates to change the tension of the wire so that the wire maintains a preset reference tension.

5 Claims, 3 Drawing Sheets

APPARATUS FOR DRIVING WEARABLE ROBOT

CROSS REFERENCE TO RELATED APPLICATION

The present application claims under 35 U.S.C. §119(a) the benefit of Korean Patent Application Number 10-2013-0156979 filed on Dec. 17, 2013, which is hereby incorporated by reference in its entirety.

BACKGROUND (1) Technical Field

The present invention relates, in general, to an apparatus for driving a wearable robot and, more particularly, to an apparatus for driving a wearable robot that is capable of moving a plurality of joints using one driver and a wire.

(2) Description of the Related Art

Wearable robots are designed to be directly worn by a user and assist the user working in industrial fields, and are each made up of an upper limb corresponding to user's upper body and a lower limb corresponding to user's lower body. The upper limb is provided with an arm that is coupled to user's arm and cooperates with the user's arm as if it were part of his or her body. Therefore, when an unassisted user cannot lift or carry a heavy object by himself or herself normally, the robotic arm functions to assist the user with his/her work, so that the user can lift or carry the heavy object.

Generally, the robotic arm is equipped with a plurality of joints and a plurality of motors installed in the joints so as to allow smooth movement along with the user's arm. The plurality of motors is appropriately driven to move the robotic arm according to the movement of a user's arm.

This conventional structure can be found from the disclosure of Korean Unexamined Patent Application Publication No. 10-2012-0059305 (entitled "SHOULDER ARTICULATION STRUCTURE OF WEARABLE ROBOT"). In the above reference, a shoulder articulation structure of a wearable robot includes a slide having a guide groove passing through the center thereof a pitch driving motor connected to the slide so as to be able to move forward and backward, a linkage, one side of which is connected to the pitch driving motor and is inserted into the guide groove, and the other side of which is provided outside the slide, a roll driving motor connected to an end of the linkage provided outside the slide, and a rotary arm that is rotatably connected to the roll driving motor.

However, when such a conventional structure is used, it is difficult to avoid increasing the weight of the wearable robot due to the plurality of driving motors. This causes the user to have difficulty doing his/her work using the wearable robot.

The foregoing is intended merely to aid in the understanding of the background of the present invention, and is not intended to mean that the present invention falls within the purview of the related art that is already known to those skilled in the art.

SUMMARY

An apparatus for driving a wearable robot is provided, in which a plurality of joints are connected to one driver by a wire so as to be driven, and gross weight of the wearable robot is decreased by reducing the number of drivers.

In order to achieve the above object, according to one aspect of the present invention, there is provided an apparatus for driving a wearable robot, which includes a wire having one end connected to an arm of the wearable robot; a tension detector that is provided between the one end and the other end of the wire and detects tension of the wire; a driver that is connected to the other end of the wire and winds or unwinds the wire; and a controller that controls the driver to be operated to wind or unwind the wire when the arm rotates to change the tension of the wire so that the wire maintains a preset reference tension.

The wire may include a driver-side wire having one end connected to the driver, and an arm-side wire having one end connected to the arm.

The tension detector may include: a driver-side hook having one end connected to the driver-side wire; an arm-side hook having one end connected to the other end of the arm-side wire, and the other end hooked on the driver-side hook; and a pressure sensor that is installed on the driver-side hook or the arm-side hook contact and detects pressure applied to the driver-side wire and the arm-side wire when the driver-side hook and the arm-side hook come into contact with each other.

The driver-side hook and the arm-side hook may be a quadrangular ring and a bent panel, respectively, and be configured to intersect at right angles and form a hooking structure in such a way that inner surfaces of the other ends of the driver-side hook and the arm-side hook are arranged substantially opposite to each other.

The arm-side hook may include a roller at one end of the arm-side hook, and the arm-side wire may be configured so that opposite ends of the arm-side wire are coupled to different arms, and a middle of the arm-side wire is wound around the roller.

The apparatus may further include a support panel by which the driver is fixed and supported.

The support panel may include a rail at a position corresponding to the arm-side hook so that the arm-side hook is movably engaged.

According to another aspect of the present invention, there is provided a system for driving a wearable robot, in which, when an arm of the wearable robot rotates to change a tension of a wire having one end connected to the arm, a driver connected to the other end of the wire is driven to wind or unwind the wire such that the wire maintains a preset reference tension.

According to the apparatus for driving a wearable robot as described above, a uniform force is adapted to be applied to the wire and the arm at all times. Thereby, when the user lifts up or puts down an object, a uniform force is applied to the wire and the arm at all times, and thus stable work is made possible.

Further, since a plurality of joints can be driven by one driver without using a plurality of drivers, this can reduce complexity of control, and lead to control-related stability and a cost-saving effect.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

An apparatus for driving a wearable robot according to an exemplary embodiment of the present invention will be described in detail with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 1:
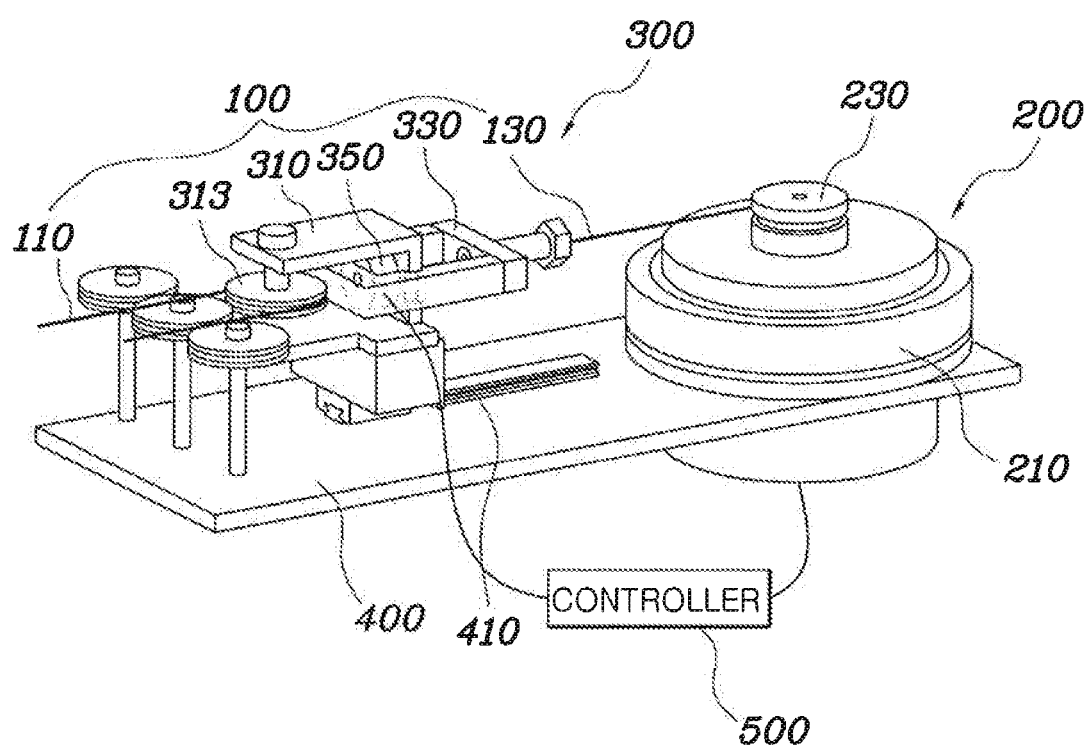
FIG. 1 is a perspective view of an apparatus for driving a wearable robot according to an embodiment of the present invention.

FIG. 1 shows a configuration of an apparatus for driving a wearable robot according to an embodiment of the present invention. An apparatus for driving a wearable robot according to an embodiment of the present invention includes: a wire 100 having one end connected to an arm 600 of the wearable robot; a tension detector 300 that is provided between the one end and the other end of the wire 100 and detects tension of the wire 100; a driver 200 that is connected to the other end of the wire 100 and winds or unwinds the wire 100; and a controller 500 that controls the driver 200 to be operated to wind or unwind the wire 100 when the arm 600 rotates to change the tension of the wire 100 so that the wire 100 maintains a preset reference tension.

More specifically, the arm 600 is a part corresponding to an arm of a user of the wearable robot, and includes all parts such as a joint and a hand.

The driver 200 includes a motor 210 providing a driving force, and a pulley 230 that is rotatably fixed to a rotary shaft of the motor 210 and is wound by the wire 100.

The wire 100 is made up of a driver-side wire 130 having one end coupled to the pulley 230 of the driver 200, and an arm-side wire 110 having one end coupled to the arm 600. The tension detector 300 includes: a driver-side hook 330 having one end connected to the driver-side wire 130; an arm-side hook 310 having one end coupled to the other end of the arm-side wire 110, and the other end hooked on the driver-side hook 330; and a pressure sensor 350 that is installed on the driver-side hook 330 or the arm-side hook 310 and detects pressure applied to the driver-side wire 130 and the arm-side wire 110 when the driver-side hook 330 and the arm-side hook 310 come into contact with each other.

The driver-side hook 330 and the arm-side hook 310 preferably are a quadrangular ring and a bent panel, respectively, and may be provided to intersect at right angles and form a hooking structure in such a way that inner surfaces of the other ends of the driver-side hook 300 and the arm-side hook 310 are arranged substantially opposite to each other, i.e., they are arranged at least in part to be opposite to each other. Since the hooks intersect in the hooking structure, even when the wire 100 becomes loose, the hooks can be still maintained in a hooked state. Further, since one of the hooks is the panel having a large contact area, stable hooking is possible.

However, the driver-side hook 330 and the arm-side hook 310 may have various shapes such as an "L" shape and a "C" shape, in addition to the quadrangular ring shape and the panel shape. The two hooks need not have the same shape. In other words, the hooks may have the ring shape and the bent panel shape, and are provided so that the inner surfaces of the other ends thereof come into contact with each other.

On the other hand, the pressure sensor 350 is a sensor detecting pressure applied to one face thereof and may be a load cell.

The pressure sensor 350 is installed on the inner surface of the other end of the driver-side hook 330 or the arm-side hook 310, and measures tension applied to the driver-side wire 130 and the arm-side wire 110. Since the wire 100 is connected by hooking of the hooks, the wire 100 maintains substantially the same tension. When the tension occurs at the wire 100, the inner surfaces of the other ends of the hooks 310 and 330 come into contact with each other. Thus, the pressure sensor 350 installed on the inner surface of the hook 310 or 330 is pressed in proportion to the tension and detects the tension of the wire 100.

On the other hand, the arm-side hook 310 may be provided with a roller 313 at one end thereof. The arm-side wire 110 may be provided so that the opposite ends thereof are coupled to respective different arms, and the middle of the arm-side wire 110 is wound around the roller 313. The roller 313 may have a groove formed in the middle of an outer circumference thereof like a sheave so as to prevent the wire from being separated.

Since the opposite ends of the arm-side wire 110 are coupled to the respective different arms, the same activating force can be applied to different joints by the driver 200.

Meanwhile, the apparatus for driving a wearable robot may further include a support panel 400 by which the driver 200 is fixed and supported. The support panel 400 may be separately installed on a main body of the wearable robot facing the back of a user. Alternatively, the support panel 400 itself may serve as the main body.

The support panel 400 may be provided with a rail 410 at a position corresponding to the arm-side hook 310 so that the arm-side hook 310 is movably engaged.

More specifically, the rail 410 may be provided in a movement direction of the arm-side hook 310, and the arm-side hook 310 moves along the rail 410 as the driver-side wire 130 is wound and unwound around the driver 200.

Due to the rail 410, the driver-side wire 130 can be stably supported. The rail 410 can support the weight of the arm-side wire 110 and the weight of the driver-side wire 130. When the user moves or works, the arm-side hook 310 and the driver-side hook 330 may be out of position due to their own weight and thus change the tension of the wire 100, thereby affecting an output value of the pressure sensor 350. This can be avoided because the arm-side hook 310 is stably supported on the rail 410. Further, the driver 200 can be driven by only the change in the tension of the arm-side wire 110.

Figure 2:
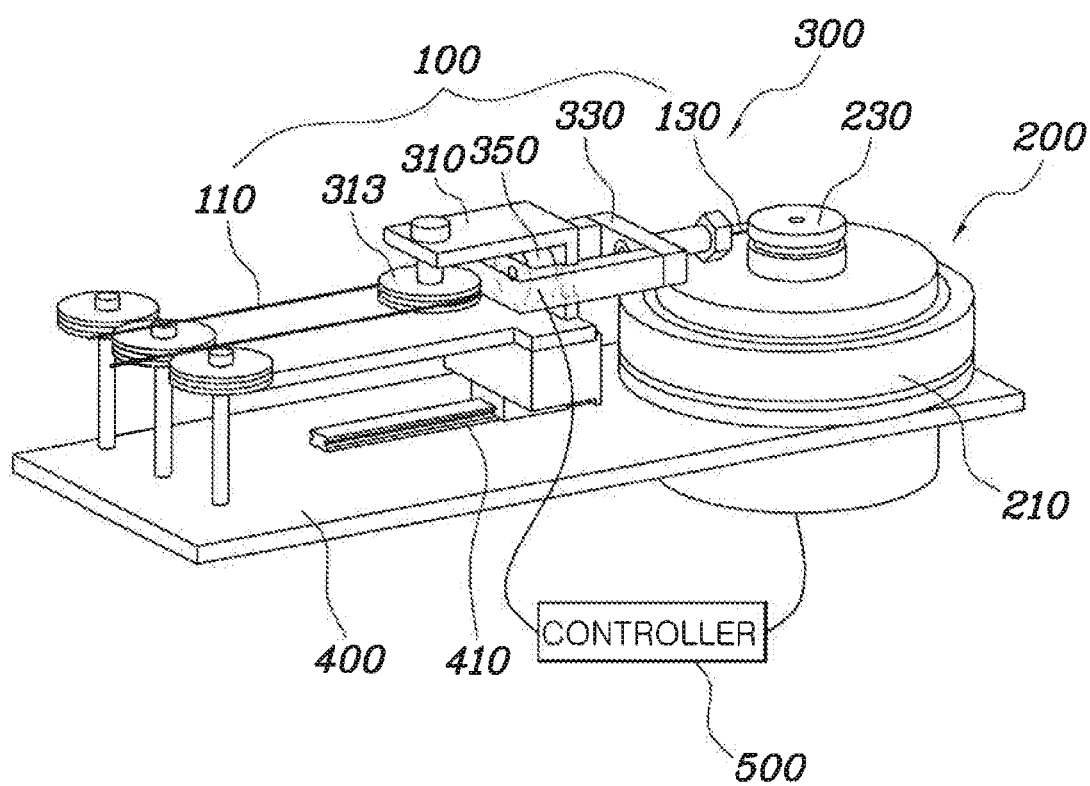
FIG. 2 is a perspective view of the apparatus of FIG. 1 in which a driver for the apparatus according to the embodiment of the present invention is driven.
Figure 3:
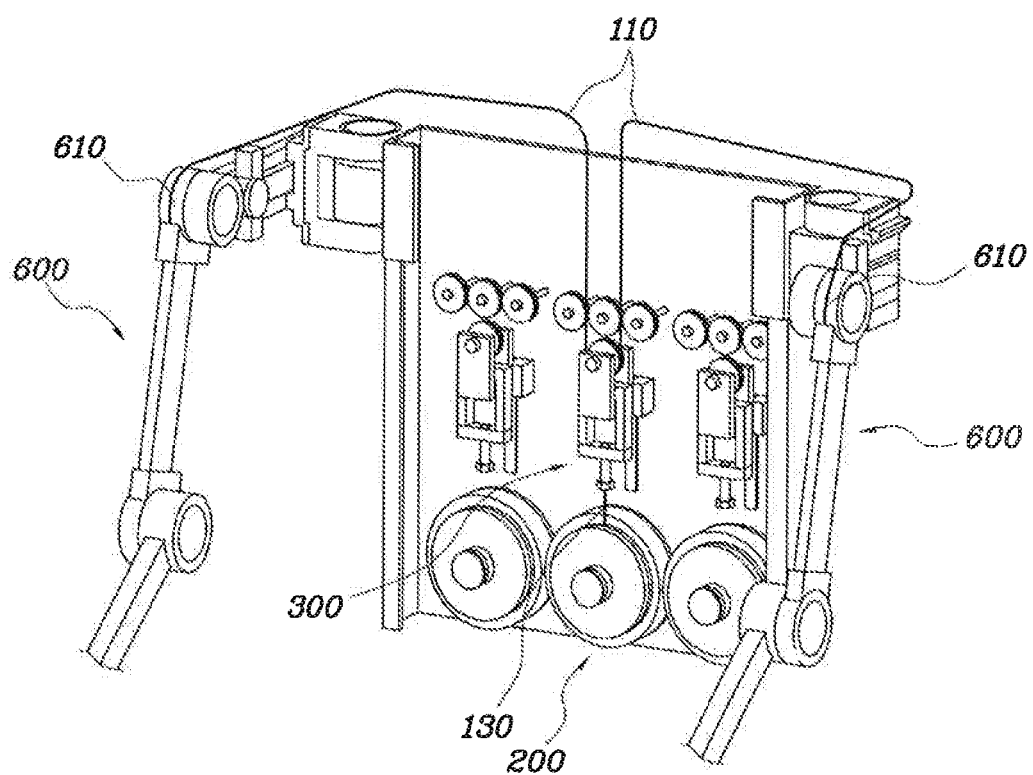
FIG. 3 is a perspective view of the apparatus of FIG. 1 in which the apparatus according to the embodiment of the present invention is installed.

An operation of the apparatus for a wearable robot according to the embodiment of the present invention will be described with reference to FIGS. 1 to 3. FIG. 3 shows a state in which one end of the arm-side wire 110 is coupled to a shoulder joint 610 of the wearable robot. When the user lifts his/her arm, the shoulder joint 610 of the wearable robot rotates upward. Thus, the arm-side wire 110 coupled to the shoulder joint 610 of the wearable robot becomes loose, and the tension of the arm-side wire 110 becomes weaker than the preset reference tension. Since total tension of the arm-side wire 110 is equal to the tension of the driver-side wire 130, forces acting on ends of the arm-side hook 310 and the driver-side hook 330 in opposite directions are also weakened, and thus the pressure acting between the two hooks is also decreased.

When the tension becomes lower than the reference tension and is detected by the pressure sensor 350, the pressure sensor 350 sends the detected result to the controller 500. Then, to restore the tension to the reference tension again, the controller 500 operates the driver 200 so as to wind the driver-side wire 130. As shown in FIG. 2, the driver-side hook 330 causes the arm-side hook 310 to slide toward the driver 200 while moving toward the driver 200. As a result, the tension of the driver-side wire 130 and the tension of the arm-side wire 110 are increased again. When the tension reaches the reference tension again, the operation of the driver 200 comes to a stop.

Even though the different joints coupled to the opposite ends of the arm-side wire 110 move in a different fashion, the total tension of the arm-side wire 110 is eventually made equal to the tension of the driver-side wire 130. Therefore, the total tension of the arm-side wire 110 maintains the reference tension at all times, and the same force is applied to each joint. Accordingly, the degree of freedom of movement of the user can be guaranteed.

According to the apparatus for driving a wearable robot having the above-mentioned structure, a uniform fore is adapted to be applied to the wire and the arm at all times. Thereby, when the user lifts up or puts down an object, a uniform force is applied to the wire and the arm at all times, and thus stable work is made possible.

Further, since a plurality of joints can be driven by one driver without using a plurality of drivers, this can reduce complexity of control, and lead to control-related stability and a cost-saving effect.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An apparatus for driving a wearable robot comprising:
   a wire having one end connected to an arm of the wearable robot;
   a tension detector that is provided between the one end and the other end of the wire and detects tension of the wire;
   a driver that is connected to the other end of the wire and winds or unwinds the wire; and
   a controller that controls the driver to be operated to wind or unwind the wire when the arm rotates to change the tension of the wire so that the wire maintains a preset reference tension,
   wherein the wire includes a driver-side wire having one end connected to the driver, and an arm-side wire having one end connected to the arm, and
   wherein the tension detector includes:
   a driver-side hook having one end connected to the driver-side wire;
   an arm-side hook having one end connected to the other end of the arm-side wire, and the other end hooked on the driver-side hook; and
   a pressure sensor that is installed on the driver-side hook or the arm-side hook contact and detects pressure applied to the driver-side wire and the arm-side wire when the driver-side hook and the arm-side hook come into contact with each other.

2. The apparatus according to claim 1, wherein the driver-side hook and the arm-side hook are a quadrangular ring and a bent panel, respectively, and are provided to intersect at right angles and form a hooking structure in such a way that inner surfaces of the other ends of the driver-side hook and the arm-side hook are arranged substantially opposite to each other.

3. The apparatus according to claim 1, wherein the arm-side hook includes a roller at one end of the arm-side hook, and the arm-side wire is configured so that opposite ends of the arm-side wire are coupled to different arms, and a middle of the arm-side wire is wound around the roller.

4. The apparatus according to claim 1, further comprising a support panel by which the driver is fixed and supported.

5. The apparatus according to claim 4, wherein the support panel includes a rail at a position corresponding to the arm-side hook so that the arm-side hook is movably engaged.

* * * * *